Sept. 6, 1938.　　　F. W. DUNMORE　　　2,128,923
RADIO SYSTEM FOR AZIMUTH INDICATION
Filed May 16, 1933　　　3 Sheets-Sheet 1

Inventor
Francis W. Dunmore

By J. F. Mothershead

Attorney

Sept. 6, 1938.        F. W. DUNMORE            2,128,923
           RADIO SYSTEM FOR AZIMUTH INDICATION
              Filed May 16, 1933        3 Sheets-Sheet 2

Inventor
Francis W. Dunmore

By J. F. Mothershead

Attorney

Sept. 6, 1938.                F. W. DUNMORE                 2,128,923
                    RADIO SYSTEM FOR AZIMUTH INDICATION
                        Filed May 16, 1933           3 Sheets-Sheet 3

Inventor
Francis W. Dunmore
By J. F. Mothershead
Attorney

Patented Sept. 6, 1938

2,128,923

UNITED STATES PATENT OFFICE 2,128,923

RADIO SYSTEM FOR AZIMUTH INDICATION

Francis W. Dunmore, Washington, D. C., assignor to the Government of the United States represented by the Secretary of Commerce Application May 16, 1933, Serial No. 671,371

20 Claims. (Cl. 250—11)

(Granted under the act of March 3, 1883, as amended April 30, 1928; 370 O. G. 757)

The invention described herein may be manufactured and used by or for the Government of the United States for governmental purposes only without the payment of any royalty thereon.

My invention relates to a radio azimuth indicator for use on mobile objects in which by the relative amplitudes of vibration of four tuned reeds, the azimuth location of the object with respect to a radio beacon may be determined either by directly observing the reeds or the effect on a needle of the current generated by their movement.

In this invention the reeds in the azimuth indicator are operated by four unidirectional signals, transmitted simultaneously, each in one of the directions of the four main points of the compass and each modulated at a different frequency. The reeds in the azimuth indicator are tuned one to each of these modulation frequencies. Other uses for and advantages of my invention will be more clearly understood by reference to the following description and diagrammatic drawings.

Figure 4:
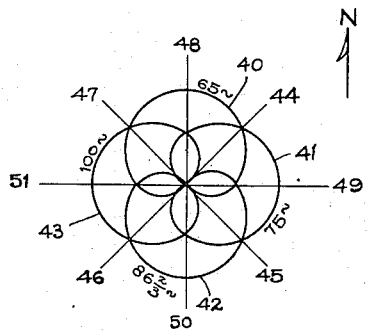
Fig. 4 shows the four unidirectional radio beacon signals each modulated at one of the frequencies to which the reeds are tuned and which operate the reeds.

The indicators shown herein are primarily intended for use with a radio beacon transmitting unidirectional signals, such as for example shown in Figure 4, wherein the cardioid signal 40 sent north is modulated at 65 cycles, the signal 41, one sent east at 75 cycles; 42 the one sent south at 86⅔ cycles, and 43 the one sent west at 100 cycles. All cardioid signals are sent simultaneously and on the same carrier frequency. Opposite cardioids are transmitted with a time phase of 90 degrees in the carrier frequency. These signals produce eight courses 44, 45, 46, 47, 48, 49, 50 and 51, which correspond to the markings 29 to 36 inclusive, respectively. These unidirectional signals may be produced by the means shown and described in copending application Serial No. 679,366, filed July 7, 1933.

Figure 1:
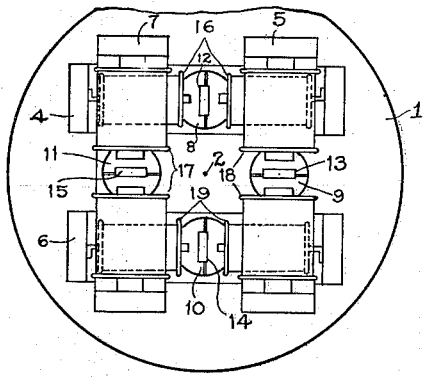
Fig. 1 shows the arrangement of the tuned reeds about a common axis each with its respective driving coils.
Figure 2:
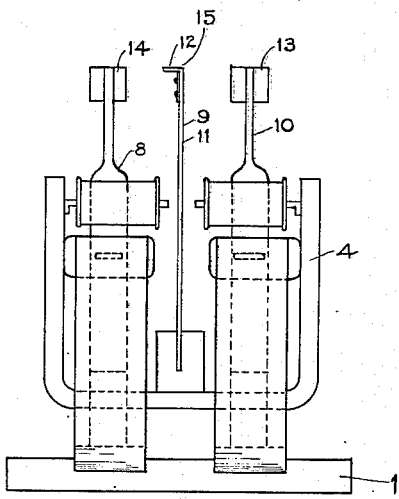
Fig. 2 is a side view showing the polarizing magnets and air dampers on the reed.

In the form of my invention illustrated in Figure 1 a base 1 is rotatable about an axis 2. This base may be manually rotatable or moved by a gyro compass or gyro repeater compass 3 (Figs. 8 and 10) so that it is held fixed with respect to north. Four permanent magnets 4, 5, 6 and 7 are provided for polarizing the reeds 8, 9, 10 and 11, respectively, these reeds being each tuned to a different frequency, say 65, 75, 86⅔ and 100 cycles, respectively. Each reed carries a white tab 12, 13, 14 and 15 on its free end. 16 is the driving coil for the reed 8, 17 the driving coil for the reed 11, 18 the driving coil for the reed 9, and 19 the driving coil for the reed 10. These driving coils may all be connected in series to the output of a radio receiving set. These various elements are also shown in Fig. 2.

Figure 3:
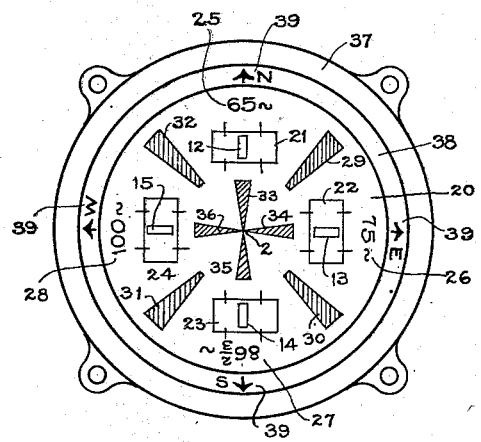
Fig. 3 shows the arrangement of the face of the indicator showing the tabs on the free end of each reed which are seen through a window in front of each tab.

Fig. 3 is a top plan view of one form of my invention. Here 20 is a face plate carried by base 1 which face plate may be the azimuth indicating part of a gyro compass or gyro repeater compass. 12, 13, 14 and 15 are the white tabs on the free ends of the reeds seen through four windows 21, 22, 23 and 24, respectively, in face plate 20. Characteristic markings opposite each reed are shown at 25, 26, 27 and 28 on face plate 20. The markings for the four strong broad courses are shown at 29, 30, 31 and 32, and the markings for the four weak sharp courses are shown at 33, 34, 35 and 36. 37 is the case housing the whole unit. 38 is a ring independently rotatable about the axis 2 and carrying azimuth markings 39.

Figure 5:
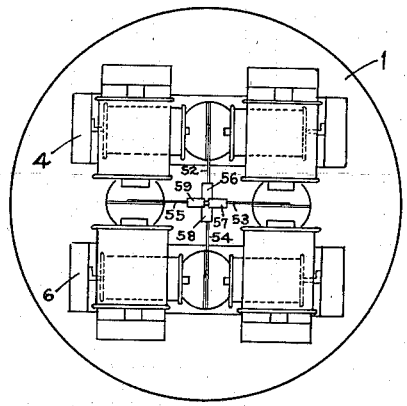
Fig. 5 shows a plan view of a modification of my invention in which the four reed vibrations are viewed through a single window.
Figure 6:
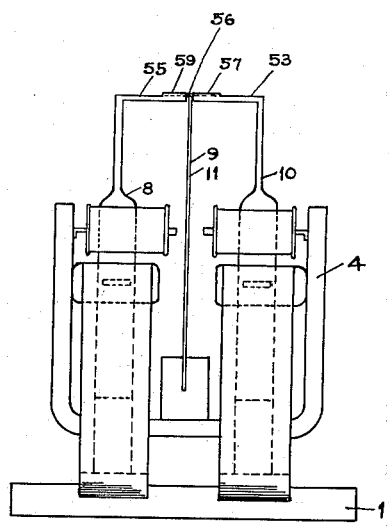
Fig. 6 shows the method of placing the tabs on an extended arm attached to the reed.
Figure 7:
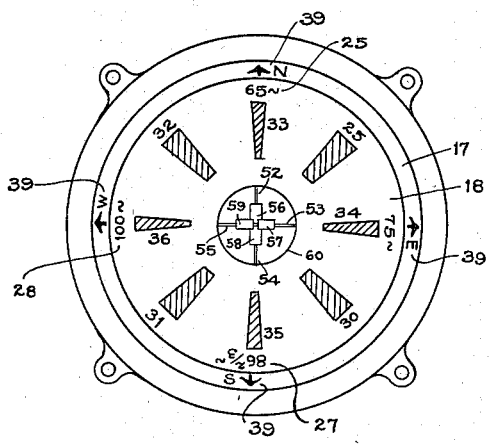
Fig. 7 is a face view of the modification illustrated in Fig. 5 and shows the four tabs through a central window.

Figs. 5, 6 and 7 show a modification of my invention in which each tab, instead of being attached to the end of the reed directly, is placed on the end of an arm and observed adjacent to the other tabs through a central window. In these figures, 52, 53, 54 and 55 are the extending arms attached to the 65 cycle, 75 cycle, 86⅔ cycle and 100 cycle reeds, respectively. These arms each carry a tab 56, 57, 58 and 59, respectively, the tabs 56 and 58 moving just under tabs 57 and 59. The movement of all four tabs may be observed through a single window 60.

Figure 8:
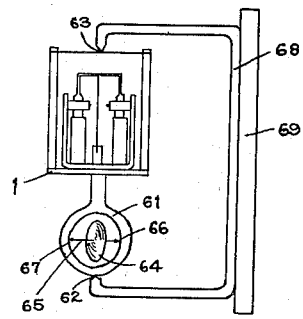
Fig. 8 shows a method of attaching the unit to a gyro compass or gyro repeater compass.
Figure 9:
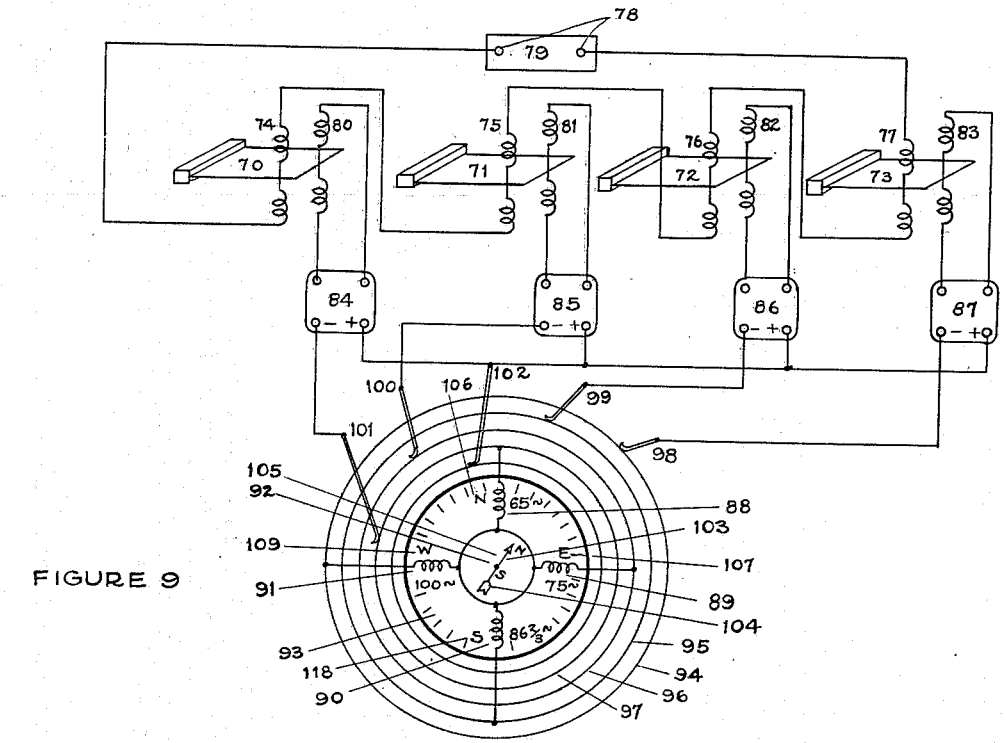
Fig. 9 shows a modification of my invention in which a voltage is generated by the motion of each reed, each of said voltages acting on a moving indicating means to give the location of the mobile object with respect to the beacon.
Figure 10:
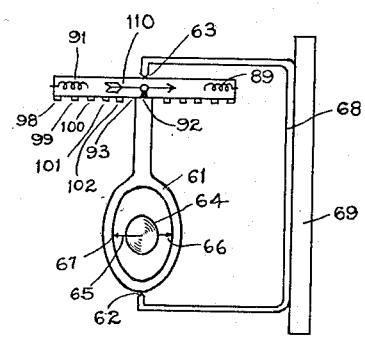
Fig. 10 illustrates a method of supporting the exciting means for the moving indicating means, on the azimuth indicating means of a gyro compass or gyro repeater compass.

Fig. 8 shows a method of attaching the reed unit to a gyro compass or gyro repeater compass 3. Here the base 1 is carried on a gimbal 61, pivoted at 62, 63. 64 is the gyro rotor element with a shaft 65 mounted in bearings 66 and 67. Pivots 62 and 63 are carried by base 68 which is attached to instrument board 69. Still another modification of my invention is shown in Fig. 9. Here the movement of each reed generates an alternating current voltage, the four voltages being rectified and applied to four field coils symmetrically arranged to act on a central needle which turns toward the coil or coils having the greatest current. Fig. 10 shows how the unit is held by the orienting means of a gyro compass 3.

The operation of the indicator shown in Figs. 1–8 is as follows: The reeds 8, 9, 10 and 11 are so located on base 1, and base 1 is so attached to the azimuth indicating means on the gyro compass or gyro repeater compass that the 65-cycle reed will stay set toward the north, the 75-cycle reed east, the 86⅔-cycle reed south and the 100-cycle reed west. If they are not so attached to a gyro compass they may be oriented manually to the correct positions.

Since the reeds remain oriented before the pilot in the same relative positions with respect to the azimuth that the respective unidirectional modulated signals are sent out, the relative amplitude of the various reeds indicates the azimuth angular position about the beacon of the mobile object upon which the indicator is installed. For example, referring to Figs. 3 and 4, if tabs 15 and 13 are moving with equal amplitude, 12 stationary and 14 having greater amplitude than either 15 or 13 then the airplane must be on course 50. If 14 and 15 are going with equal amplitude and 12 and 13 nearly stationary, then the airplane is on course 46, etc. In the same way intermediate lines of flight between courses may be estimated by the relative amplitudes of the four reeds. Thus along a line intermediate between courses 46 and 50, the indications of the tabs would be as follows: 14 would be going with the greatest amplitude, 15 with the next greatest, 13 with the next, and 12 practically stationary. In other words at all different azimuth positions about the beacon the relative amplitudes of the four tabs attached to the vibrating reeds will be different so that the azimuth location about the beacon may be determined.

Not only does this type of indicating device keep a pilot from getting lost, and not knowing which quadrant he is in or course he is on, but it also tells him when he is passing over the beacon station, which is very necessary information. The minute the beacon is passed the indications given by the reeds are reversed, thus for example, if the pilot is flying north on course 35 Fig. 3, the tab 14 will indicate a strong vibration of the reed to which it is attached while tab 12 will be practically stationary, the instant the beacon station is passed over the indications given by these two tabs is reversed—i. e., 14 becomes stationary and 12 moves with large amplitude. This same effect is obtained only from different tabs when flying on courses 48, 49, 50 and 51. When flying course 46, for example, tabs 14 and 15 have equal large amplitudes and 12 and 13 have equal small amplitude, but when the beacon is passed 12 and 13 have equal large amplitudes and 14 and 15 have equal small amplitudes. Courses 45, 46 and 47 give a similar effect only from different tabs.

In the modification of my invention shown in Figs. 9 and 10, the reed units 70, 71, 72 and 73 are of the converter type. Coils 74, 75, 76 and 77 are the driving coils, respectively connected to the output terminals 78 of a suitable beacon receiving set 79. 80, 81, 82 and 83 are the generating coils respectively, the output of each being rectified by oxide rectifiers 84, 85, 86 and 87 respectively. 88, 89, 90 and 91 are four magnet coils, each arranged at 90 degrees with respect to its neighbor and symmetrically located about a center point 92. These are carried on a base 93 which moves with the azimuth indicating means of a gyro compass or gyro repeater compass. The base 93 also carries slip rings 94, 95, 96 and 97, which are connected to magnet coils 91, 90, 89 and 88, respectively. By means of brushes 98, 99, 100 and 101, these magnet coils are connected to the direct current output of oxide rectifiers 87, 86, 85 and 84 respectively, through a common brush 102. The direct current output of these rectifiers is so connected to their respective magnet coils that the ends of the magnet coils toward the center will all be of like polarity when excited. 103 is a polarized indicating means with one pole at one end, the other at the center. 104 is a non-magnetic extension to act as a counterbalance. The complete unit 105 is pivoted on the center 92, this center being attached to the base 93. The base 93 also carries markings 106, 107, 108 and 109 indicating the cardinal points of the compass—N., E., S. and W., respectively, with the customary intermediate markings. Coil 88 is placed under marking 106, and 89 under marking 107, coil 90 under marking 108, and coil 91 under marking 109.

In Fig. 10 is shown a method of orienting the four field coils so that they may be set with respect to the cardinal points of the compass and held thus by a gyro compass or repeater compass. Here the base 93 is shown carried on a gimbal 61 mounted in bearings 62 and 63. The gyro-revolving element 64 which may be electrically or air driven, is mounted on a shaft 65 in bearings 66 and 67. The base 68 carries the pivots 62 and 63 and is attached to the airplane instrument board 69.

The operation of this modification of my invention is as follows: Since the four different cardioid signals are sent in each of the four cardinal directions of the compass, and since coils 88, 89, 90 and 91 are held to these cardinal points by means of the gyro compass attached to them, and since each coil is excited only by the signal as received from one of the cardioid transmissions, a magnetic needle 110 must assume a position with respect to the compass card on base 93 similar to that of the airplane in space with respect to the beacon. Thus, if the airplane is north of the beacon, see Fig. 4, the 65-cycle signal will predominate; reed 70 (the 65-cycle reed), Fig. 9, will vibrate with greatest amplitude, coil 80 exciting coil 88 under the north marking 106 and needle 110 will be pulled around to line up with coil 88 with arrow end of the needle pointing south, thus indicating that the airplane is north of the beacon.

Figure 12:
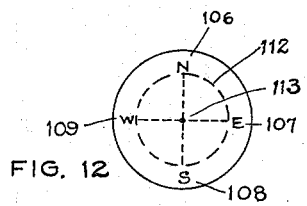
Fig. 12 is an end view of Fig. 11.
Figure 11:
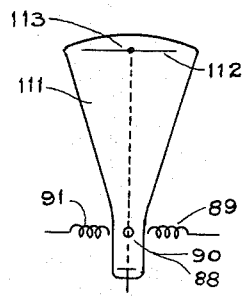
Fig. 11 is a diagram which shows how the output from the four moving reeds may be made to act on a cathode stream to align the spot in a position similar to that of the mobile object with respect to the beacon.

Still another modification of my invention is shown in Figs. 11 and 12, where a cathode ray tube 111 is used, the cathode stream strikes a fluorescent screen 112. The screen has the cardinal points of the compass 106, 107, 108 and 109 on it. The magnet coils 88, 89, 90 and 91 are connected as shown in Fig. 9. These coils are located symmetricaly about the cathode stream as a center and each coil is placed in 90 degrees relation to its neighbor. The spot 113 on screen 112 will assume a position about the center of the screen 112 similar to the location of the mobile object about the beacon. The cathode tube 111 may be carried by the moving element of a gyro compass or gyro repeater compass as indicated in Fig. 10.

While the above is one form of my invention, there are other ways of orienting the four reed unit or the four magnet unit with respect to the four cardinal points of the compass, and while but one form of moving needle indicator is shown, other types of field coil and moving element may be adopted such that the moving means will align itself in the direction of maximum flux from the field unit. Therefore, I do not wish to be limited to these specific embodiments, since modifications may be made both in the circuits and apparatus within the scope of my invention.

What I claim is:

1. In a radio azimuth indicator, a gyro compass with azimuth indicating means rotatable about an axis and carrying four reeds each tuned to a different frequency and symmetrically located about said axis, separate means carried by said indicator for driving each reed, a tab attached to the free end of each reed, a face plate attached to said azimuth indicating means provided with a window in front of each of said tabs and characteristic markings and azimuth marking on the indicator adjacent to and in cooperative reading relation with said tabs.

2. In a radio azimuth indicator, a gyro repeater compass with azimuth indicating means rotatable about an axis and carrying four reeds each tuned to a different frequency and symmetrically located about said axis, separate electromagnetic means carried by said azimuth indicating means for driving each reed, a tab attached to the free end of each reed, a face plate attached to said azimuth indicating means provided with a window in front of each of said tabs and characteristic markings and azimuth marking on the plate adjacent to said tabs.

3. In a radio azimuth indicator a base rotatable about an axis and carrying four reeds each tuned to a different frequency and symmetrically located about said axis, separate driving means associated with each of said reeds and attached to said base, a tab attached to the free ends of each reed, a face plate attached to said base provided with a window in front of each of said tabs, and a plurality of markings designating courses and also characteristic markings on said plate and azimuth markings associated with said tabs, a second face plate independently rotatable about said axis as a center and carrying index marks.

4. In a radio azimuth indicator, four reeds each tuned to a different frequency and each having a free end and a fixed end, each of said free ends carrying a tab, said four reeds being symmetrically located about a common axis such that two of said reeds vibrate in the same plane and in a plane parallel to said axis and the other two in a plane at right angles to the plane of vibration of said first two reeds and in a plane parallel to said axis, a common base attached to said fixed ends of said reeds, said common base being rotatable about said common axis, separate means attached to said common base for driving each of said reeds, a face plate attached to said common base having a window in front of each of said tabs each of said tabs being associated with a different characteristic marking and with azimuth markings, a second face plate independently rotatable about said common axis said face plate carrying an index mark.

5. In a radio azimuth indicator, four reeds each tuned to a different frequency and each having a free end and a fixed end each of said free ends carrying a tab said four reeds being symmetrically located about a common axis such that two of said reeds vibrate in the same plane and in a plane parallel to said axis and the other two in a plane at right angles to the plane of vibration of said first two reeds and in a plane parallel to said axis, a common base attached to said fixed ends of said reeds, a gyro compass with azimuth indicating means said azimuth indicating means carrying said common base and turning about said common axis as a center, separate means attached to said common base for driving each of said reeds, a face plate attached to said common base provided with a window in front of each of said tabs, each of said tabs being associated with a different characteristic marking and with azimuth markings.

6. In a radio azimuth indicator, a gyro repeater compass with azimuth indicating means rotatable about an axis and carrying four reeds each tuned to a different frequency and symmetrically located about said axis, separate electromagnetic driving means mounted on an indicator for operating respectively each reed, an arm attached to the free end of each reed and extending to said axis, a tab attached to the free end of each arm two of said extended arms moving under the other two said extended arms, a face plate attached to said azimuth indicating means with a window centrally located about said axis said four tabs being behind said window said plate being provided with characteristic markings and azimuth markings on said face plate opposite each of said tabs.

7. In a radio azimuth indicator, four reeds, each tuned to a different frequency, each with a driving coil, and each with a generating coil, common input terminals connected to said driving coils, four rectifiers, each provided with input and output terminals, each of said generating coils being connected to said input terminals of one of said rectifiers, a base member, a set of four electromagnet coils each arranged at 90 degrees with respect to its neighbor and about a common center of the base member, each of said electromagnet coils being electrically connected to said output terminals of a different one of said rectifiers, a moving element responsive to said electromagnet coils and pivotally mounted about said common center of said base, markings indicating cardinal points of the compass on a face of the base and associated with each of said electromagnetic coils, and a gyro compass with the azimuth indicating means thereof attached to said base.

8. In a system of radio azimuth indication, a radio beacon transmitting four unidirectional signals each partially overlapping its neighbor and each modulated at a different frequency and each transmitted in a different direction with maximum signal in a direction of one of the four cardinal points of the compass, a radio receiving set on a mobile object and responsive to said unidirectional signals, frequency selection means connected in the output of said receiving set whereby each of said unidirectionally transmitted signals acts through one of four separate circuits arranged with respect to the four cardinal points of the compass and attached to the azimuth indicating means of a gyro compass such that a common means excited by said four separate circuits will indicate the azimuth position of said radio receiving set with respect to said radio beacon.

9. In a radio system of azimuth indication, a radio beacon with four unidirectionally transmitted signals each partially overlapping its neighbor, each modulated at a different frequency and each transmitted in a different direction with maximum signal in a direction of one of the four cardinal points of the compass, a radio receiving set on a mobile object and responsive to said beacon signals, four separate electro-magnetic circuits, each circuit being arranged in 90 degrees relation to each adjacent magnetic circuit and about a common center and attached to a gyro azimuth indicating means, separate means connected in the output of said receiving set responsive to each of said modulated signals each of said responsive means producing a separate output voltage each of said output voltages exciting a different one of said four separate electro-magnetic circuits, a single means rotatable about said common center and responsive to the excitation in each of said separate magnet circuits the position of said single means with respect to said magnetic circuits indicating the azimuth location of said radio receiving set with respect to said radio beacon.

10. In a radio system of azimuth indication, a radio beacon with four unidirectionally transmitted signals each partially overlapping its neighbor each modulated at a different frequency and each transmitted in a different direction with maximum signal in a direction of one of the four cardinal points of the compass, a radio receiving set on a mobile object and responsive to said beacon signals, four separate electro-magnetic circuits each circuit being arranged in 90 degrees relation to each adjacent magnetic circuit and about a cathode ray stream as a center, separate means connected in the output of said receiving set responsive to each of said modulated signals each of said responsive means producing a separate output voltage, each of said output voltages exciting a different one of said four separate electro-magnet circuits, said cathode ray stream being responsive to the excitation in each of said separate magnet circuits the position of said cathode stream with respect to said magnetic circuits indicating the azimuth location of said radio receiving set with respect to said radio beacon.

11. In a radio system of azimuth indication, a radio beacon with four unidirectionally transmitted signals each partially overlapping its neighbor each modulated at a different frequency and each transmitted in a different direction with maximum signal in a direction of one of the four cardinal points of the compass, a radio receiving set on a mobile object and responsive to said beacon signals, separate means connected in the output of said receiving set responsive to each of said modulated signals each of said responsive means producing a separate output voltage, a cathode ray tube with cathode ray and screen with azimuth markings, four separate electromagnetic circuits symmetrically arranged in 90 degrees relation to each adjacent magnetic circuit and about the cathode ray as a center, a gyro azimuth indicating means, moving means for said gyro said moving means carrying said four electromagnetic circuits and said screen each of said output voltages exciting a different one of said four electro-magnet circuits, said cathode ray being responsive to said excitations such that its position on said screen indicates the azimuth location of said radio receiving set with respect to said beacon.

12. In a system of radio azimuth indications for mobile objects, a radio beacon transmitting unidirectional signals in different directions of the compass simultaneously each partially overlapping its neighbor in space and each modulated at a different frequency, an indicator on said mobile object and responsive to said radio beacon signals including a plurality of operating means each tuned to a different one of said modulated frequencies, visual signal indicating means operated by said operating means, an azimuth scale in cooperative relation with said visual signal indicating means, a gyro-compass having azimuth indicating means with the azimuth scale thereon, the operating means of said visual signal indicating means being carried by the azimuth indicating means of said compass, said visual signal indicating means being mounted to be orientable about an axis, and the operation of said visual signal indicating means indicating the azimuth of said mobile object with respect to said radio beacon.

13. In a system of radio azimuth indications for mobile objects, a radio beacon transmitting unidirectional signals in different directions of the compass simultaneously each partially overlapping its neighbor in space and each modulated at a different frequency, an indicator on said object and responsive to said radio beacon signals including reeds each tuned to a different one of said modulated frequencies, a visual signal indicating means operated from the vibration of said reeds, an azimuth scale associated with said visual signal indicating means, and a gyro-compass having azimuth indicating means with the azimuth scale thereon, said visual signal indicating means being mounted on the azimuth indicating means of said compass and orientable about the axis thereof, the operation of said visual signal indicating means indicating the azimuth of said mobile object with respect to said radio beacon.

14. In a system of radio azimuth indications, for mobile objects, a radio beacon which transmits four unidirectional signals simultaneously each partially overlapping its neighbor in space and each modulated at a different frequency and each transmitted in a different direction with maximum signal in a direction of one of the four cardinal points of the compass; an indicator on said object and responsive to said radio beacon signals including four reeds each tuned to a different one of said modulation frequencies, a gyrocompass on said object having azimuth indicating means, visual signal indicating means, means for operating the visual signal indicating means from the vibration of said reeds, and an azimuth scale cooperating with said visual means, said visual indicating means and said operating means being mounted on the azimuth indicating means of said gyro-compass, said visual means being orientable about a vertical axis, the operation of said visual means indicating azimuth of said mobile object with respect to said radio beacon.

15. In an indicator of azimuth on mobile objects for use with a radio beacon, four reeds tuned to a different frequency, visual signal indicating means, means for operating said visual signal indicating means from the vibration of said reeds, a gyro-compass having an azimuth indicating means, an azimuth scale cooperating with said azimuth indicating means and said visual signal indicating means, said visual signal indicating means and its operating means being mounted on the azimuth indicating means of said gyro-compass, said visual signal indicating means being mounted to be orientable about the axis of azimuth indicating means, and the operation of said signal indicating means indicating azimuth of said object with respect to the radio beacon.

16. In an indicator of azimuth of mobile objects for use with a radio beacon, a plurality of visual signal indicating means, tuned means for operating said signal indicating means, each at a different frequency from the other, a gyro-compass having an azimuth indicating means, an azimuth scale cooperating with said azimuth indicating means and said visual signal indicating means, said visual indicating means being mounted on the azimuth indicating means of said gyro-compass and being mounted to be orientable about the axis of the azimuth indicating means, and the operation of said signal indicating means indicating azimuth of said object with respect to the radio beacon.

17. In a radio system of azimuth indication for mobile objects a radio beacon which transmits four unidirectional signals simultaneously each partially overlapping its neighbor in space and each modulated at a different frequency and each transmitted in a different direction with maximum signal in a direction of one of the four cardinal points of the compass; four reeds on said object each tuned to a different one of said modulation frequencies and responsive to said radio beacon signals, a visual indicating means, means for operating said visual means by the vibration of said reeds, a gyro-compass on said object having azimuth indicating means, an azimuth scale cooperating with said visual means and mounted together with said operating means on the azimuth indicating means of the gyro-compass, said visual means being orientable about a vertical axis, the movement of said visual means indicating azimuth of said object with respect to said radio beacon.

18. In a radio azimuth indicator adapted to be operated by a radio beacon transmitting unidirectional signals simultaneously, each partially overlapping its neighbor and each modulated at a different frequency and transmitted in a different direction with maximum signal in a direction of one of the cardinal points of the compass, a radio receiving set on a mobile object for receiving said signals, a frequency selection means connected to the output of said receiving set, separate circuits for each frequency, a gyro-compass having azimuth indicating means, signal indicating means responsive to said frequencies to denote different points of the compass and carried by said compass, and a common means excited by said separate circuits for actuating said signal indicating means to indicate the azimuth position of said radio receiving set with respect to the beacon.

19. In a radio azimuth indicator, four reeds, each tuned to a different frequency, each with a driving coil, and each with a generating coil, common input terminals connected to said driving coils, four rectifiers, each provided with input and output terminals, each of said generating coils being connected to said input terminals of one of said rectifiers, a gyro-compass having azimuth indicating means, a set of four power absorbing elements each arranged at 90 degrees with respect to its neighbor and about a common center, each of said power absorbing elements being electrically connected to said output terminals of a different one of said rectifiers, a moving element responsive to said power absorbing elements and pivoted about said common center on said azimuth indicating means markings indicating cardinal points of the compass on the azimuth indicating means and associated with each of said power absorbing elements.

20. In a radio system of azimuth indication, a radio beacon station equipped with means for transmitting a plurality of unidirectional signals on the same carrier frequency each simultaneously in a different direction and each modulated at a different frequency, a radio beacon receiver on a mobile object remote from said beacon and responsive to said carrier and said modulated frequencies, and a plurality of responsive means on said object and each having exciting means connected to the output of said radio beacon receiver, each of said responsive means being tuned to a different one of said modulation frequencies and responsive thereto, azimuth designations adjacent to said responsive means said responsive means being arranged radially symmetrical with respect to a common center and rotatable as a unit about the said center, and with respect to the azimuth designations, the relative response of each of said responsive means giving an azimuth indication of the location of the mobile object relative to said radio beacon.

FRANCIS W. DUNMORE.